UNITED STATES PATENT OFFICE.

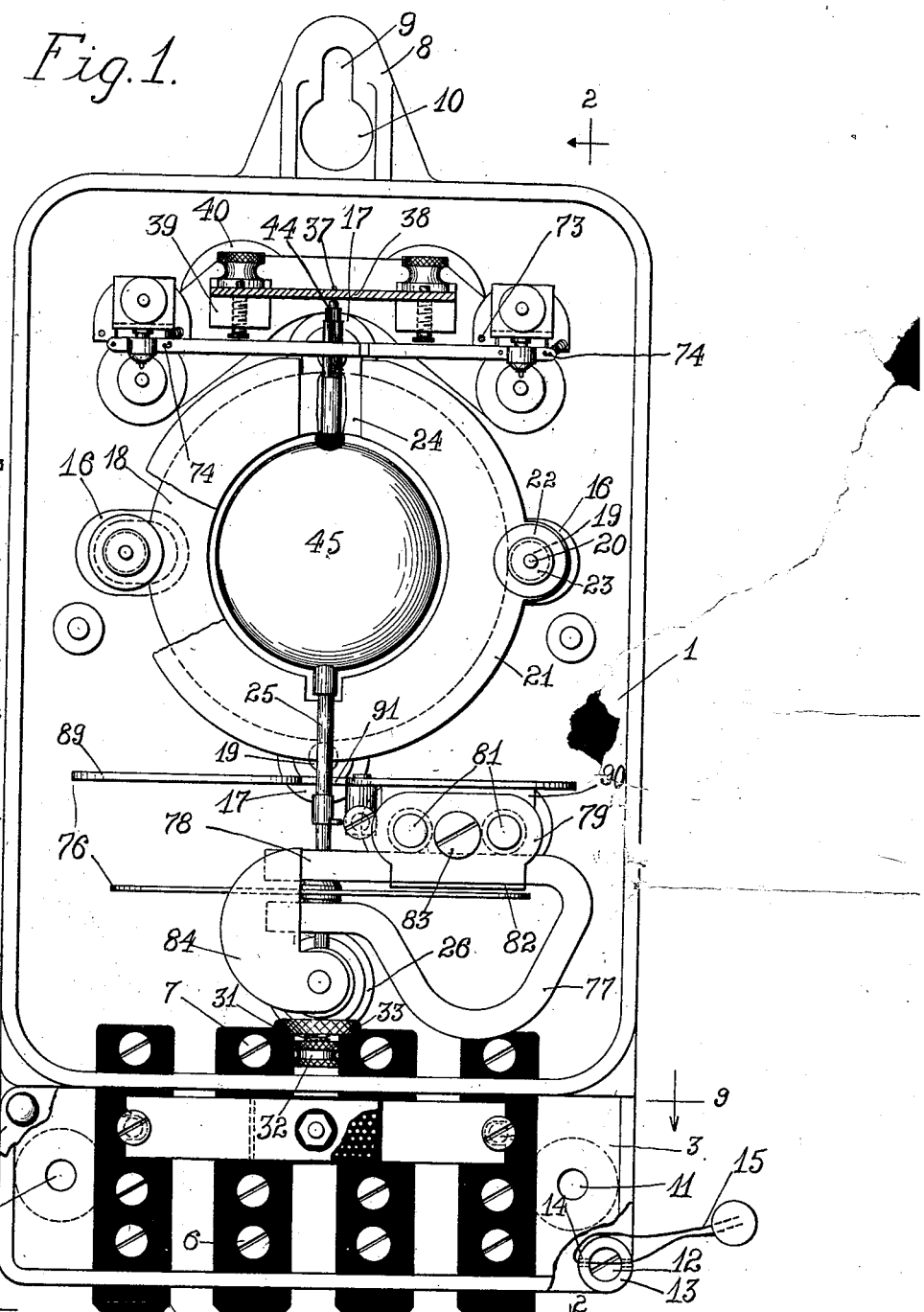

GEORGE M. WILLIS, OF CHICAGO, ILLINOIS, ASSIGNOR, BY MESNE ASSIGNMENTS, TO CHICAGO ELECTRIC METER COMPANY, OF CHICAGO, ILLINOIS, A CORPORATION OF ILLINOIS.

ELECTRIC METER.

1,084,589. Specification of Letters Patent. Patented Jan. 13, 1914.

Application filed November 27, 1908. Serial No. 464,548.

*To all whom it may concern:*

Be it known that I, GEORGE M. WILLIS, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters, particularly to wattmeters, and it is concerned more particularly with the construction, arrangement and adjustment of the parts controlling the electrical operation and efficiency of the meter.

The various features of my invention will be best understood when described by reference to the accompanying drawings which show a meter to which my invention is particularly adaptable.

In the drawings Figure 1 is a front view of the meter with the inclosing casing parts removed, Fig. 2 is a sectional view of the common supporting member for the lower armature bearing and for the damping magnet shunting member.

The meter frame comprises a main compartment 1 adapted to be inclosed by a suitable cover, not shown, and an auxiliary compartment 3 adapted to be closed by a lid 4. Through the compartment 3 and into the compartment 1 extend the various terminal sleeves 5, each having clamping screws 6 for securing external wires and a clamping screw 7 for securing meter wires. At the top of the meter frame is a lug 8 having a screw slot 9 leading from the opening 10. Through the base wall of the frame within the compartment 3 are the screw holes 11. The lid 4 is secured in closed position by a screw 12 engaging in pocket 13 formed on the lid, the walls of which pocket have openings 14 through which a sealing wire 15 can be inserted to lock the screw in its closed position. The terminal screws 6 and the screws for securing the meter to the wall are, therefore, inaccessible unless the seal is broken.

At the upper part of the main compartment 1 and extending from the frame base are a plurality of lugs 16 and 17 arranged in the arc of a circle and being elongated radially to form seating surfaces for a circular field coil 18. At the outer ends of the seat lugs, pins or posts 19 are secured, preferably by being driven into openings in said lugs, these pins being equidistant from the center of the field coil, the coil being clamped between these posts and held against displacement in the direction of its plane. The posts on the side lugs 16 extend forwardly from the field coil and have the reduced threaded extensions 20 for receiving an annular clamping plate 21 which is held in place by washers 22 and thumb nuts 23. This annular plate engages the front face of the field coil and clamps this coil to the seating surfaces of the lugs. By virtue of the posts and this clamping plate, the field coil is rigidly and permanently held in position. This annular plate is of non-magnetic material and is made discontinuous by a slot 24, and therefore eddy or other disturbing current flow will be broken up. Extending parallel and diametrically across and in front of the field coil is the armature spindle 25, the lower bearing arrangement of which is best shown in Fig. 2. Driven into a lug 26 at the lower part of the main compartment is a post 27 having the enlargement 28 with the vertical pocket 29, into which the lower end of the armature spindle extends. In the opposite side of the enlargement is the pocket 30 into which threads the screw 31 having the knurled head 32 and supporting the jam nut 33. The end of this screw 31 supports the lower concave bearing member 34, while in the end of the armature spindle is supported a companion concave bearing member 35, a pivot ball 36 being interposed between the bearing members.

The upper end 37 of the armature spindle has pivotal bearing in a plate 38. This plate is secured to the front ends of arms 39, whose reduced ends are driven into supporting lugs 40 extending from the frame at the upper part of main compartment 1. At the front end of this plate is supported suitable integrating mechanism, not shown, comprising a plurality of vertical shafts whose upper ends also pivot in said plate 37, the driving pinion 44 connected with the armature spindle being in driving relation with the integrating mechanism. The various pivot ends of the transmission members and the driving end of the armature being thus pivoted in a common plate, true and efficient gearing relations are always assured. The armature 45 is made spherical, the rear half thereof being encircled by the field coil.

Mounted on the lower end of the armature spindle 25 is a speed adjusting or retarding disk 76, which disk is spanned by the poles of a retarding magnet 77. This retarding magnet is adjustably held in place by the clamping of its uniplanar base part 78 between a pair of clamping plates one of which is shown at 79, the clamping plate 79 being rigidly secured to the forward end of posts 81 extending from the meter frame, and the other clamping plate being slidable on said posts, the magnet being held between the plates by the flanges 82 of the clamping plates and the posts 81. The clamping screw 83 passes through the plate 79 and threads into the other clamping plate. By slightly loosening this screw the magnet can be slid longitudinally between the clamping plates and its damping effect on the disk adjusted. The damping effect of the magnet can be further adjusted by means of a semi-circular member 84 which is secured at an eccentric point to an adjusting sleeve 85. This adjusting sleeve is threaded, and engages a threaded forward extension 86 on the bearing post 27. The sleeve 85 is also slitted and its lower end tapered as shown, to be engaged by the tapered collar 87 on a locking nut 88. By rotation of the sleeve 85, the magnetic shunt member can be moved to subject more or less shunting area to the poles of the retarding magnet, rotation of this sleeve also causing variation in the length of air gap between the shunting member and the magnet poles. By means of the bodily adjustment of the magnet and the shunting member with its compound movement, very delicate adjustment can be made for the damping effect and the speed of the meter very accurately regulated. The damping magnet is protected from the magnetic field of the field coil by a magnetic shield 89 interposed between the magnet and field coil and supported from the frame by means of a foot 90 clamped between the magnet supporting posts 81 and the meter frame. This magnetic shield has a slot 91 extending rearwardly from its front edge for accommodating the armature spindle.

It will be seen from the foregoing description that the electric features of the meter are extremely simple, and yet very efficient. The meter will register with equal accuracy when connected with direct current or with alternating current circuits, and no auxiliary adjusting devices are therefore necessary.

Changes, of course, could be made in the construction and arrangement of the meter of my invention which would still come within the scope of my invention, and I do not, therefore, limit myself to the precise construction and arrangement herein shown and described.

I desire to secure the following claims by Letters Patent:

1. In an electricity meter, the combination of an armature, field producing means for said armature, a retarding disk rotated upon rotation of said armature, a retarding magnet spanning said disk, a magnetic shunting member for said retarding magnet, and means for changing the amount of surface of the shunting member presented to the magnet.

2. In an electricity meter, the combination of a rotatable shaft, a retarding disk carried by the shaft, a retarding magnet associated with the disk, and means for shunting the flux from the magnet around the disk as desired, and a clamp for holding such magnet so that it may be moved toward or away from such shunting means as desired.

3. In an electricity meter, the combination of an armature, field producing means for said armature, a retarding disk rotated upon rotation of said armature, a retarding magnet spanning said disk, a magnetic shunting member for said retarding magnet, and means for changing the amount of surface of the shunting member presented to the magnet and for adjusting the air gap between said shunting member and said magnet.

4. In an electricity meter, the combination of an armature, field producing means for said armature, a retarding disk rotated upon rotation of said armature, a retarding magnet spanning said disk, a magnetic shunting member for said retarding magnet, and adjusting means for simultaneously adjusting the effective shunting area of said shunting member and the air gap between said shunting member and the magnet.

5. In an electricity meter, the combination of an armature, torque producing means for said armature, a retarding disk adapted to rotate upon rotation of the armature, a retarding magnet associated with said disk, a magnetic shunting member for said magnet, and means permitting rotation of said shunting member to adjust the effective shunting area thereof and also the air gap between said shunting member and the magnet.

6. In an electricity meter, the combination of an armature, torque producing means for said armature, a speed regulating disk connected to rotate upon rotation of the armature, a magnet associated with said disk, and a magnetic shunting member associated with said magnet, and rotatably mounted to adjust the air gap between said member and the magnet.

7. In an electricity meter, the combination of an armature, a field coil surrounding said armature, supports for said field coil, an annular plate engaging the field coil, and means extending from the meter base engaging the annular plate to hold said field coil against said supports, said plate being discontinuous in order to break up disturbing currents which might flow therethrough.

8. In an electricity meter, the combination of an armature, a field coil parallel to the axis of rotation of the armature and encircling said armature at one side of its axis, supports for the field coil, an annular plate surrounding the armature and engaging the field coil, and means extending from the meter base engaging the annular plate to hold said coil against the supports, said annular plate being discontinuous to prevent eddy or other disturbing current flow.

In witness whereof, I hereunto subscribe my name, this 17th day of November, 1908.

GEORGE M. WILLIS.

Witnesses:
CHARLES J. SCHMIDT,
FRANK J. THELEN.

Copies of this patent may be obtained for five cents each, by addressing the "Commissioner of Patents, Washington, D. C."